US005608879A

United States Patent [19]
Cooke

[11] Patent Number: 5,608,879
[45] Date of Patent: Mar. 4, 1997

[54] METHOD AND APPARATUS FOR ARBITRATING DATA REQUESTS AND RESPONSES THERETO AS SEPARATE BUS TRANSACTIONS

[75] Inventor: Conrad C. Cooke, Witney, United Kingdom

[73] Assignees: Sony Corporation, Tokyo, Japan; Sony United Kingdom Limited, Weybridge, England

[21] Appl. No.: 516,518

[22] Filed: Aug. 17, 1995

Related U.S. Application Data

[63] Continuation of Ser. No. 125,148, Sep. 23, 1993, abandoned.

[30] Foreign Application Priority Data

Dec. 11, 1992 [GB] United Kingdom .................. 9225924

[51] Int. Cl.⁶ ................................................ G06F 13/00
[52] U.S. Cl. ........................................ 395/290; 395/299
[58] Field of Search ...................................... 395/290, 295

[56] References Cited

U.S. PATENT DOCUMENTS

| | | | |
|---|---|---|---|
| 4,380,798 | 4/1983 | Shannon et al. | 395/725 |
| 4,602,327 | 7/1986 | La Violette et al. | 395/325 |
| 4,706,190 | 10/1987 | Bomba et al. | 395/325 |
| 4,785,394 | 11/1988 | Fischer | 395/325 |
| 4,987,529 | 1/1991 | Craft et al. | 395/325 |
| 5,072,363 | 12/1991 | Gallagher | 395/725 |
| 5,101,479 | 3/1992 | Baker et al. | 395/325 |
| 5,179,705 | 1/1993 | Kent | 395/725 |
| 5,257,356 | 10/1993 | Brockmann et al. | 395/725 |
| 5,301,282 | 4/1994 | Amini et al. | 395/325 |
| 5,345,562 | 9/1994 | Chen | 395/275 |
| 5,353,416 | 10/1994 | Olson | 395/325 |

FOREIGN PATENT DOCUMENTS

| | | |
|---|---|---|
| 2007890 | 5/1979 | United Kingdom . |
| 2250161 | 5/1992 | United Kingdom . |
| WO88/08579 | 11/1988 | WIPO . |

Primary Examiner—Jack B. Harvey
Assistant Examiner—David A. Wiley
Attorney, Agent, or Firm—William S. Frommer; Alvin Sinderbrand

[57] ABSTRACT

Data processing apparatus, in which at least a first and a second data handling node are connected to a common data bus, comprises an arbitration circuit, responsive to requests for control of the data bus from the data handling nodes, for allocating control of the data bus to selected ones of the data handling nodes for successive access periods of a predetermined length. The first data handling node comprises a processor for requesting control of the data bus for one access period in order to transmit a data request to the second data handling node, and the second data handling node comprises a processor, responsive to a data request received from the first data handling node, for requesting control of the data bus for a subsequent access period to transmit the requested data to the first data handling node. Data requests and the subsequent transmission of the requested data are thus treated as two separate bus transactions, each transaction taking place during an access period of a predetermined length.

11 Claims, 5 Drawing Sheets

METHOD AND APPARATUS FOR ARBITRATING DATA REQUESTS AND RESPONSES THERETO AS SEPARATE BUS TRANSACTIONS

This application is a continuation of application Ser. No. 08/125,148, filed Sep. 23, 1993 now abandoned.

BACKGROUND OF THE INVENTION

1. Field of the Invention

This invention relates to data processing.

2. Description Of the Prior Art

A large data processing apparatus (e.g. a digital signal processing (DSP) apparatus) typically comprises a number of data handling nodes connected to a common computer bus. The data handling nodes may comprise processors, read only memories (ROMs), random access memories (RAMs), or mass data storage devices such as disc or tape drives. Alternatively, in a distributed data processing apparatus each data handling node may itself be a processor with a dedicated memory.

In order that the data handling nodes can communicate with one another via the common bus, a bus arbitration system is required to allocate control of the bus between the various nodes. Bus arbitration can be implemented in several ways. One previously proposed arrangement comprises a central bus scheduler which receives and queues requests for bus control from data handling nodes referred to as "bus masters". So-called "bus slave" nodes can be addressed via the bus by bus master nodes, but cannot themselves request (or take) control of the bus.

When a request for bus control from a particular bus master node reaches the head of the queue, the bus scheduler grants temporary control of the bus to that node, which then performs (via the bus) a data transfer operation involving another of the data handling nodes (a bus slave node). For example, a bus master node may initiate an operation to read data from a bus slave node by first requesting control of the bus. When control of the bus is granted by the bus scheduler, the bus master node sends a data request to the bus slave node, specifying a particular memory address to be read. The bus slave node accesses that memory address, reads the requested data item and transmits that data item to the bus master node. Finally, the bus master node releases the bus for allocation to another bus master node. Throughout the data transfer operation, control of the data bus is retained by the bus master node. Only when control of the bus has been voluntarily relinquished by the bus master node (i.e. at the end of the data transfer operation) can the bus scheduler grant control of the bus to the next bus master node in the queue.

SUMMARY OF THE INVENTION

It is an object of the invention to improve the arbitration between data handling nodes connected to a common data bus.

This invention provides a data processing apparatus in which at least a first data handling node and a second data handling node ape connected to a common data bus; said apparatus comprising arbitration means, responsive to requests for control of said data bus from said data handling nodes, for allocating control of said data bus to selected ones of said data handling nodes for successive access periods of a predetermined length; said first data handling node comprising means for requesting control of said data bus for one of said access periods to transmit a data request to said second data handling node; and said second data handling node comprising means, responsive to a data request received from said first data handling node, for requesting control of said data bus for a subsequent access period to transmit data requested by said data request to said first data handling node.

The invention recognises that arbitration schemes in which a bus master voluntarily relinquishes control of the bus at the end of a complete data transfer can introduce a disadvantageous slowing of the overall processing operation in situations such as the processing of a data request issued from one data handling node to another node connected to the data bus. In particular, the processing of a data request will occupy the data bus (i.e. make the data bus unavailable to other data handling nodes) for the transmission time of the read request, plus the access time for reading the requested data, plus the transmission time of the requested data. The invention addresses this problem by treating a data request and the subsequent transmission of the requested data as two separate bus transactions, each transaction taking place during an access period of a predetermined length. This reduces the time for which the data bus is unavailable to other data handling nodes duping the processing of a data request. In effect each data handling node connected to the bus now operates as a bus master, in that before a data handling node can transmit the data requested in a data request, that node must itself request control of the data bus for an access period. Accordingly, during the access time required to read a requested data item, the bus is free to be allocated to a data handling node not involved in that data request.

Although arbitration could be performed at any time in advance of a particular access period, it is preferred that the arbitration means is operable duping each of said access periods to allocate control of the data bus for the next following access period. This means that no time is wasted performing arbitration between successive access periods.

Preferably the arbitration means is operable, in the case of more than one data handling node requesting control of the data bus for a single access period, to select one of the requesting data handling nodes according to a priority order associated with the data handling nodes.

In order that, at least over a period of time, each node has an equal chance of controlling the data bus, it is preferred that the priority order associated with the data handling nodes varies between successive access periods according to a predetermined cyclic sequence.

In a preferred embodiment the arbitration means comprises a plurality of arbitration circuits, each associated with a corresponding data handling node, the arbitration circuits being interconnected by one or more arbitration control lines.

An advantageously simple embodiment in which the priority order follows the predetermined cyclic sequence comprises a cyclic counter for generating a count value, each arbitration circuit being operable to assert a priority value on the arbitration control lines to request control of the data bus, the priority value being a logical combination of the count value and a fixed value associated with that arbitration circuit.

Preferably the arbitration means comprises means for establishing a dominant priority value on the arbitration control lines in the case of more than one arbitration circuit asserting a priority value on the arbitration control lines to request control of the data bus for a single access period.

Preferably the apparatus comprises an interface node connected to said common data bus and to a second data bus, the interface node comprising: means for receiving a data item from a data handling node connected to one of the common data bus and the second data bus; means for storing said data item; and means for transmitting said data item to a data handling node connected to the other of the common data bus and the second data bus.

Preferably the first data handling node comprises: means for requesting exclusive access to the second data handling node; and means responsive to a grant of exclusive access to the second data handling node for setting a semaphore flag in the second data handling node, the semaphore flag being associated with a data resource to which simultaneous access by more than one data handling node is not permitted, relinquishing exclusive control of the second data handling node, accessing the data resource, and resetting the semaphore flag. In this way the first data handling node can take control of the data resource by setting the semaphore flag during a period in which the first data handling node has exclusive access to the second data handling node. This eliminates the possibility of two or more data handling nodes competing to set the semaphore flag at the same time. Once the semaphore flag has been set, the first data handling node can relinquish exclusive access to the second data handling node and continue to access the data resource.

The data resource may be located at the same data handling node as its associated semaphore flag, or at a different node to its flag. In a preferred embodiment, the data resource is located on the second data handling node.

Viewed from a second aspect this invention provides a method of operation of a data processing apparatus in which at least a first data handling node and a second data handling node are connected to a common data bus, said method comprising the steps of: said first data handling node requesting control of said data bus for an access period of a predetermined length to transmit a data request to said second data handling node; and said second data handling node requesting control of said data bus for a subsequent access period of said predetermined length to transmit data requested by said data request to said first data handling node.

Viewed from a third aspect this invention provides a data processing apparatus comprising: a plurality of data buses, each data bus being connected to one or more respective data handling nodes; and an interface node connected to said plurality of data buses, said interface node comprising means for receiving a data item from a data handling node connected to one of said data buses, means for storing said data item, and means for transmitting said data item to a data handling node connected to another of said data buses.

In this aspect of the invention it is recognised that by employing a plurality of data buses, each connected to one or more respective data handling nodes, communication can take place simultaneously on each of the data buses. When a node connected to one of the data buses requires to communicate with a node connected to another of the data buses, a "store and forward" protocol is used, in which a data item is sent first to an interface node, where that data item is temporarily stored for subsequent transmission to the node connected to the other data bus.

Viewed from a fourth aspect this invention provides an interface node connectable to a plurality of data buses, each data bus being connected to one or more respective data handling nodes, said interface node comprising: means for receiving a data item from a data handling node connected to one of said data buses; means for storing said data item; and means for transmitting said data item to a data handling node connected to another of said data buses.

Viewed from a fifth aspect this invention provides a method of operation of an interface node connected to a plurality of data buses, each data bus being connected to one or more respective data handling nodes, said method comprising the steps of: receiving a data item from a data handling node connected to one of said data buses; storing said data item; and transmitting said data item to a data handling node connected to another of said data buses.

Viewed from a sixth aspect this invention provides a data handling node connectable to a data bus, said data handling node comprising means, responsive to a data request received from another data handling node connected to said data bus, for reading a requested data item and for requesting control of said data bus for an access period of a predetermined length, to transmit said requested data item to said other data handling node.

BRIEF DESCRIPTION OF THE DRAWINGS

The above and other objects, features and advantages of the invention will be apparent from the following detailed description of illustrative embodiments which is to be read in connection with the accompanying drawings, in which:

Referring now to FIG. 1, a data processing apparatus is shown in which eight data handling nodes 10 are connected to a common data bus 20. The data handling nodes are numbered, or addressed, from 0 (binary 000) to 7 (binary 111). Each of the data handling nodes comprises an arbitration circuit (AC) and a processor (P). For example, node 3 (binary 011) comprises an arbitration circuit AC-3 and a processor P-3.

Figure 1:
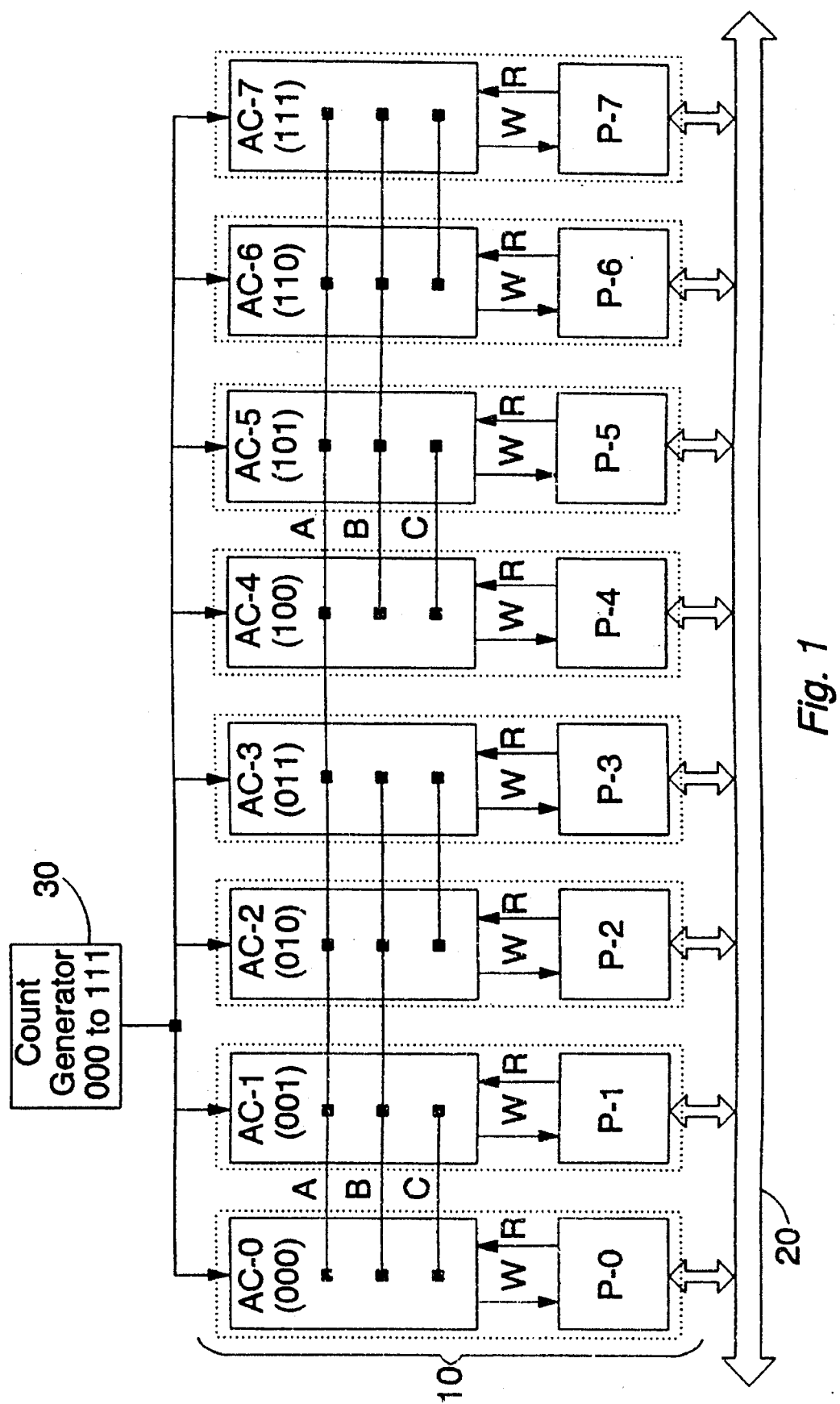
FIG. 1 is a schematic diagram of a data processing apparatus having a plurality of data handling nodes connected to a common data bus.

The processors P-0 to P-7 each comprise a central processing unit (CPU) with associated data storage such as a random access memory (RAM). The processors provide distributed data processing, in that each processor operates primarily with respect to data stored at that processor, but requires occasional access to data stored at other processors. The processors communicate with their associated arbitration circuits by means of two control lines: a bus request control line (R) with which the processor can request control of the data bus 20, and a bus win control line (W) with which the arbitration circuit can indicate to the processor that the processor has won control of the data bus 20.

The arbitration circuits AC-0 to AC-7 are similar to those described in the UK Patent Application number GB-2250161-A (Sony Corporation). In the present embodiment, control of the data bus is awarded for access periods of a predetermined length, so the arbitration circuits operate under the control of a clocking signal (not shown) to arbitrate between conflicting requests for control of the data bus 20 from two or more of the processors according to priority codes associated with the data handling nodes 10. The priority codes are generated by a logical combination of a fixed ("basic") priority code and a variable binary value in the following manner. Each of the data handling nodes 10 has a basic priority code equal to the binary complement of that node's address. For example, node 3 has a binary address of 011 and a basic priority code of 100; similarly, node 6 has a binary address of 110 and a basic priority code of 001. Arbitration is performed on a "zero dominating" basis, so that in the case of conflicting requests from two or more data handling nodes, the data handling node having the lowest binary priority code will win control of the data bus 20. In order to ensure that, at least over a period of time, each of the data handling nodes has equal access to the data bus 20, the basic priority codes are modified by an exclusive-OR combination with a cyclic count generated by a count generator 30. The count generator 30 generates count values from binary 000 to binary 111, and the combination of these counts with the basic priority codes of the data handling nodes means that the priority code of each data handling node cycles between the lowest priority (i.e. binary 111) and the highest priority (i.e. binary 000). For example, the basic priority code of node 3 (binary address 011) is binary 100. Arbitration is performed on the basis of an exclusive-OR combination of this basic priority code with the count generated by the count generator 30, so that the effective priority codes of node 3 as the count generator progresses from 000 to 111 are as follows:

| Count Value | 000 | 001 | 010 | 011 | 100 | 101 | 110 | 111 |
|---|---|---|---|---|---|---|---|---|
| Effective Priority Code | 100 | 101 | 110 | 111 | 000 | 001 | 010 | 011 |

The arbitration circuits AC-3 to AC-7 are connected to one another by three arbitration control lines A, B and C, with line A carrying the most significant bit (MSB) of the priority codes and line C carrying the least significant bit (LSB). An arbitration circuit requests control of the data bus by placing its priority code (i.e. the basic code for that node, modified by the count from the count generator 30) onto the arbitration control lines A, B and C. The arbitration control lines are arranged so that if a logical zero and a logical one are presented on a given arbitration control line by different arbitration circuits, the zero will dominate. At the end of an arbitration period, the priority code present on the arbitration control lines indicates the data handling node awarded control of the data bus 20. As described in GB-2250161-A, in order to avoid ambiguities and errors in the arbitration process, the LSB arbitration control line C connects only adjacent pairs of arbitration circuits, and the arbitration control line B connects groups of four adjacent arbitration circuits.

Figure 2:
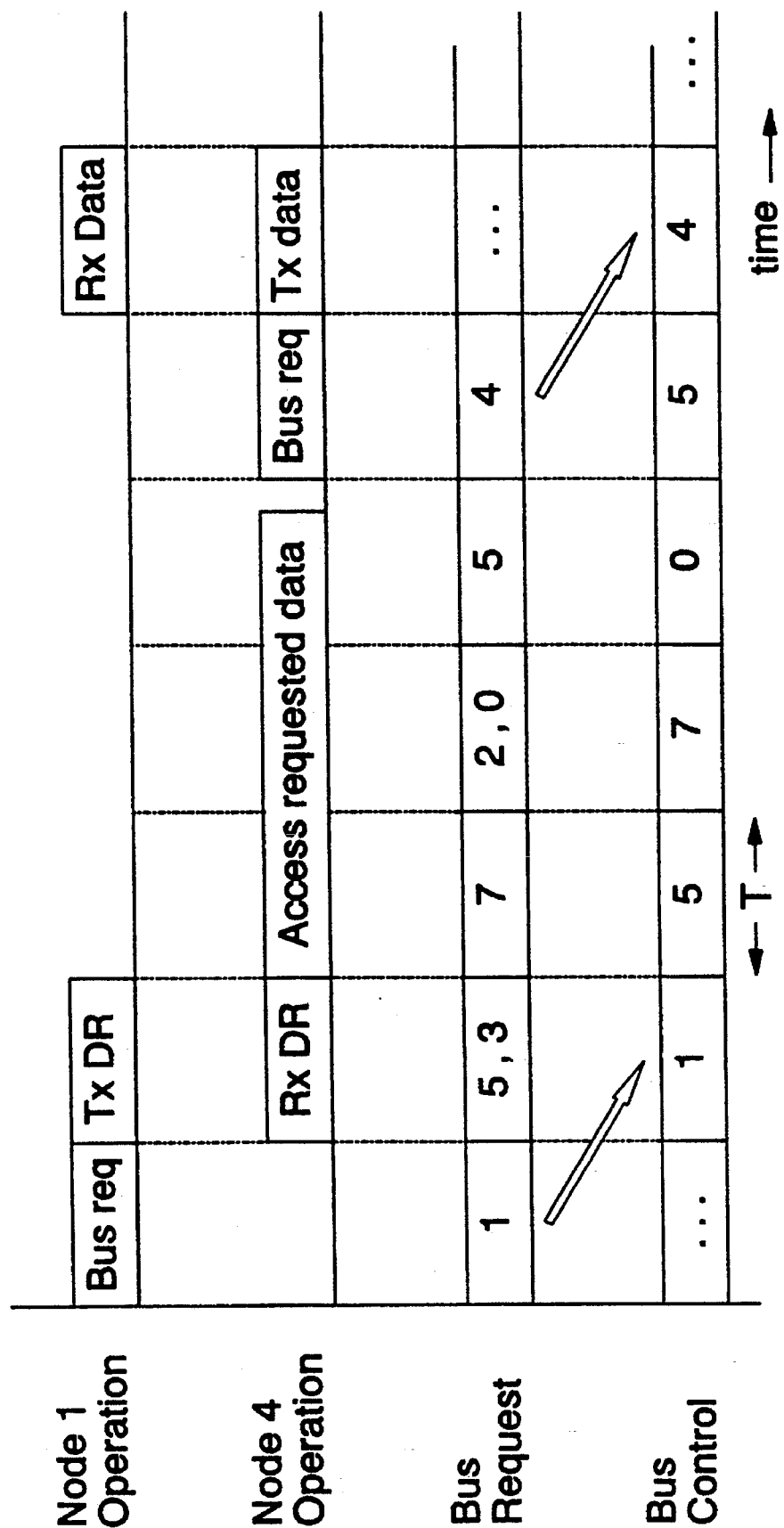
FIG. 2 is a timing diagram illustrating the operation of two data handling nodes.

FIG. 2 is a timing diagram showing the operation of two of the data handling nodes 10 (namely node 1 and node 4) during a bus transaction in which node 1 requests an item of data held by node 4. In particular, the top line of FIG. 2 shows the operation of node 1; the second line of FIG. 2 shows the operation of node 4; the third line of FIG. 2 identifies the node(s) requesting control of the data bus 20 at a given time; and the bottom line of FIG. 2 identifies the node granted access to the data bus at a given time. Time is represented along a horizontal axis, with vertical broken lines indicating successive bus access periods.

Control of the data bus 20 is granted for successive access periods of a fixed length T. Arbitration relating to control of the data bus 20 during each access period is performed during the immediately preceding access period. Any data handling nodes wishing to control the data bus 20 place their priority codes on the arbitration control lines A to C towards the start of an access period; the priority code remaining on the arbitration control lines at the end of that access period (i.e. at the start of the next access period) indicates the data handling node having control of the data bus for that next access period. Each of the access periods lasts for eighty nanoseconds (nS), which is long enough for a node to transmit a data request ("DR") to another node, or for a node to transmit an item of requested data. However, the time taken for a node to read a data item from e.g. dynamic random access memory (DRAM) is typically about 150 nS, so the access periods are not long enough for one node to transmit a data request and retain control of the data bus until the requested data has been supplied. This means that the transmission of a data request and the subsequent supply of the requested data are treated as two separate bus transactions.

During the first access period shown in FIG. 2, node 1 requests control of the data bus by placing its priority code (i.e. its basic priority code of binary 1103, combined with the count generated by the count generator 30) onto the arbitration control lines. At the end of the first access period, the priority code of node 1 remains on the arbitration control lines, indicating that node 1 has been granted control of the data bus during the second access period illustrated. During this second access period, node 1 transmits ("Tx") a data request to node 4, which in turn receives ("Rx") that data request. The data request relates to a data item held by node 4, which accordingly responds to the data request by accessing the requested data. Accessing the requested data takes almost three access periods, during which time neither node 1 nor node 4 controls the data bus. This allows other data handling nodes, namely nodes 5, 7, 0 and 5, to make use of the data bus while node 4 is accessing the requested data. In the sixth access period illustrated in FIG. 2, node 4 requests control of the data bus and is granted control for the seventh access period. In the seventh access period, node 4 transmits the requested data to node 1, which responds by receiving the requested data.

Figure 3:
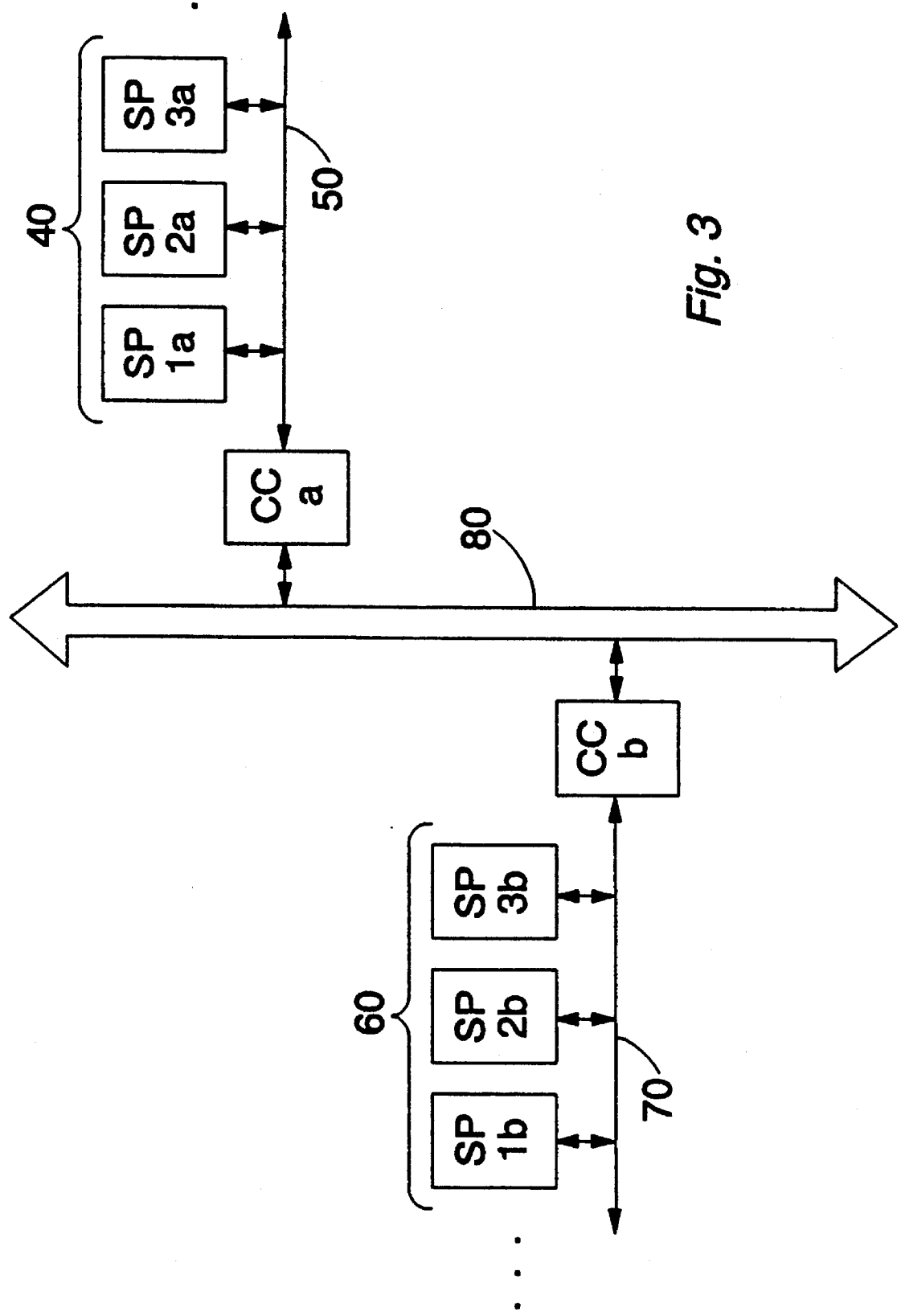
FIG. 3 is a schematic diagram of a data processing apparatus having multiple levels of data bus hierarchy.

FIG. 3 is a schematic diagram of a data processing apparatus having multiple levels of data bus hierarchy. Three signal processing data handling nodes 40 (SP1a to SP3a) and a connection (or interface) data handling node (CCa) are linked by a "mini" data bus 50. In a similar arrangement, three further signal processing data handling nodes 60 (SP1b to SP3b) and another connection data handling node (CCb) are connected to a second mini data bus 70. The two connection data handling nodes, CCa and CCb, are linked by a "main" data bus 80. A hierarchy of bus transactions is thus established, in that each of the signal processing data handling nodes 40, 60 (which may employ an internal data bus for data communication within that node's processor) is connected to a mini data bus, along with other signal processing data handling nodes with which that node normally communicates. When one of the nodes 40 requires to communicate with one of the nodes 60, a "store and forward" protocol is used in which the communication is carried out via the connection nodes CCa and CCb and the main data bus 80. This store and forward mechanism will now be described with reference to FIG. 4.

Figure 4:
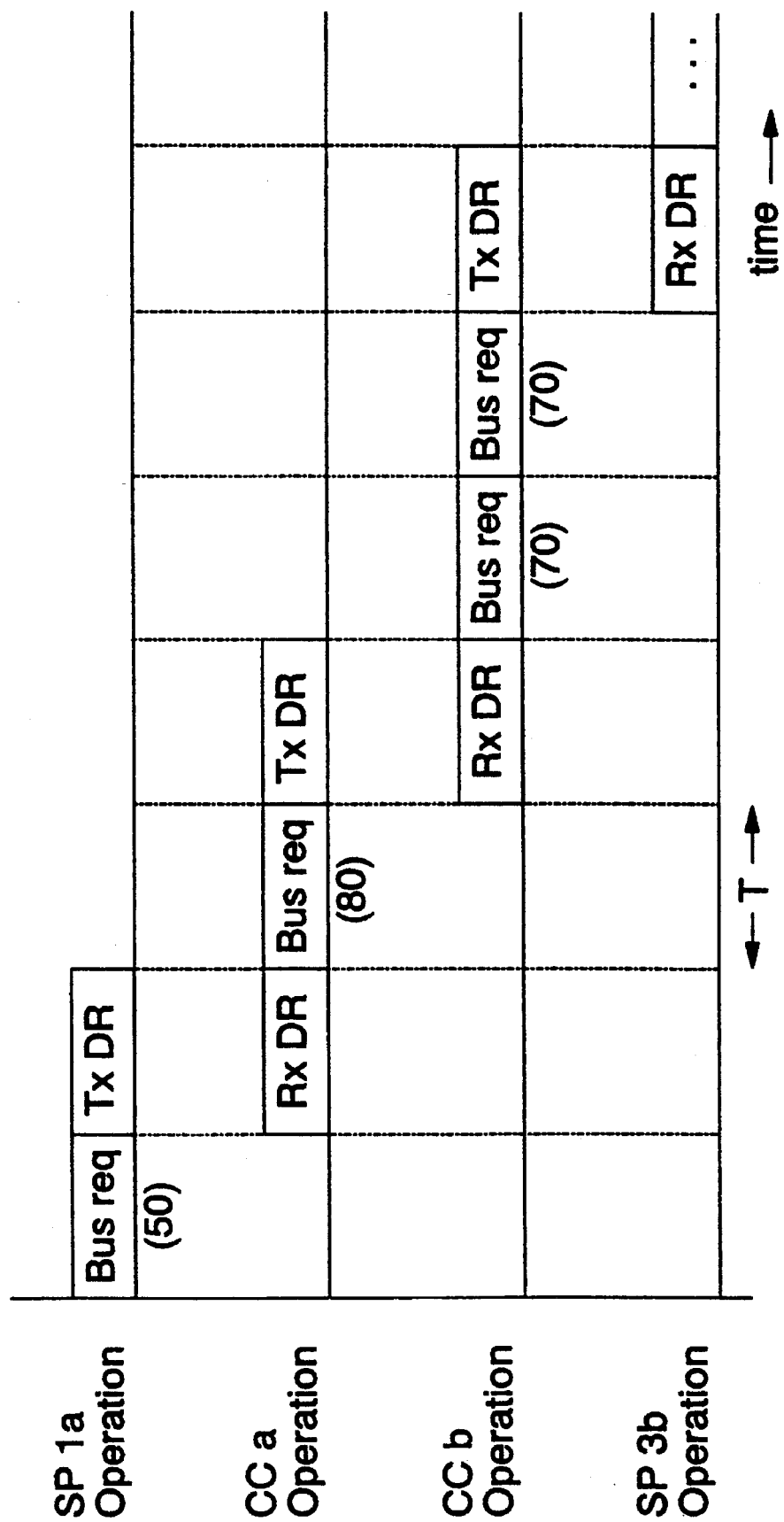
FIG. 4 is a timing diagram illustrating the operation of the apparatus of FIG. 3.

FIG. 4 is a timing diagram illustrating stages in the transmission of a data request (DR) from the data handling node SP1a, connected to the mini data bus 50, to the node SP3b, connected to the mini data bus 70. The subsequent transmission of the requested data item from the node SP3b to the node SP1a follows a similar, but reversed, sequence of events. As in the case of FIG. 2, time is represented along a horizontal axis with vertical broken lines indicating successive bus access periods.

In order for the data request to be transmitted from the node SP1a to the node SP3b (after any internal arbitration within the processor of the node SP1a), arbitration must take place on the mini bus 50, the main bus 80, and finally the mini bus 70. The first stage in the transmission of the data request occurs during the first access period shown in FIG. 4, when the node SP1a requests control of the mini bus 50. Control of the mini bus 50 is granted to the node SP1a during the next access period, and the node SP1a transmits the data request to the connection node CCa, where that request is received and stored. In the next (third) access period, the connection node CCa requests control of the main bus 80 and, when such control is granted in the fourth access period, forwards the data request via the main bus 80 to the connection node CCb. The node CCb temporarily stores the data request, and then competes for control of the mini bus 70 by requesting control of that bus during the fifth access period of FIG. 4. For the purpose of illustration, FIG. 4 shows that control of the mini bus 70 is not granted to the connection node CCb on a first request, so the node CCb requests control of the bus 70 a second time during the sixth access period of FIG. 4. Control of the mini bus 70 is then granted to the node CCb, and the data request is finally transmitted to the node SP3b.

Figure 5:
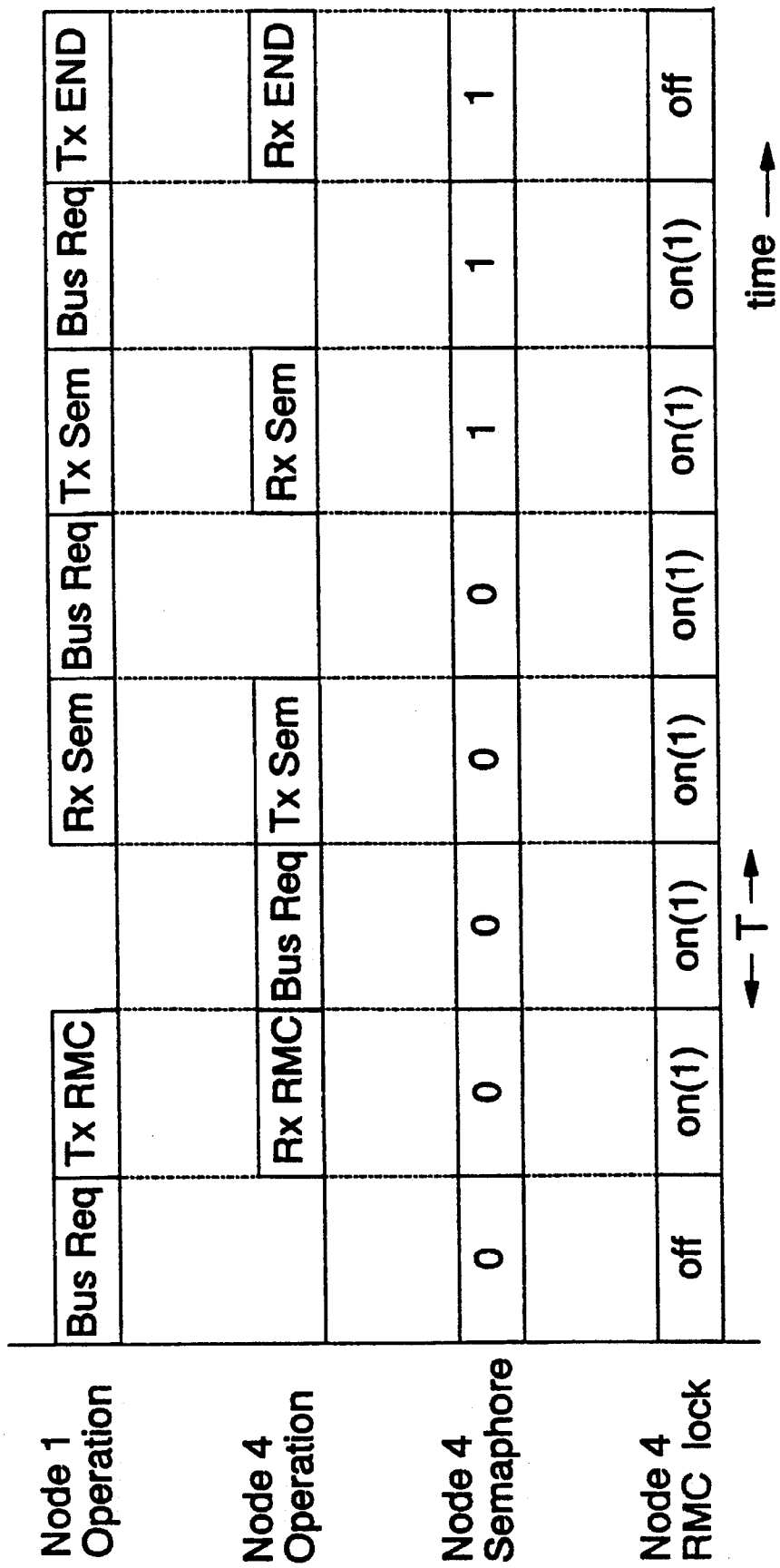
FIG. 5 is a timing diagram illustrating stages in a "node locking" process.

FIG. 5 is a timing diagram illustrating stages in a "node locking" process. This process is employed in the present embodiment to ensure that so-called "critical" resources can only be accessed by one node at a time. Examples of such critical resources are magnetic storage devices or memory locations used to store operating system scheduler queues.

A "semaphore" flag is associated with each critical resource, so that if the semaphore flag is set (logical 1) then the associated critical resource is in use. Conversely, if the semaphore is clear (logical 0) the corresponding critical resource is available for access. A single node may comprise several critical resources, each having an associated semaphore flag. However, the semaphore flags need not be located at the same node as the corresponding resource, and in fact locating a semaphore flag at different nodes to those of the associated resource can help to equalise the data traffic between the various nodes.

A further mechanism employed in node locking is the use of "RMC" read-modify-write operations, involving the grant of temporary exclusive access to a particular node. Suitable commands for executing such operations are included as part of the instruction set of the Motorola 68030 microprocessor which is employed in the nodes 0 to 7 of the present embodiment. The purpose of the RMC operations will be described below.

The stages shown in the timing diagram of FIG. 5 are those required for node 1 to set one of the semaphore flags held on node 4 to logical 1. Once that semaphore flag has been set, the critical source associated with the flag (which may or may not be located on node 4) is considered to be busy and not available for access by any other node. Accordingly, once the semaphore flag has been set, node 1 can proceed to access the critical resource without any danger of there being intervening accesses of that resource by other nodes.

Referring to FIG. 5, in the first access period illustrated, node 1 requests control of the bus. This control is granted, and in the second access period node 1 transmits an RMC read command to node 4, which in turn receives the RMC read command. Assuming that (as in the present case) node 4 was not already involved in an RMC transaction, the receipt of the RMC read command by node 4 sets an RMC "lock" held by node 4. This setting of the RMC lock is illustrated in the bottom row of FIG. 5. When the RMC lock is set, the entire node 4 is made unavailable to any node except the node which initiated the RMC transaction (in this case, node 1).

As well as setting the RMC lock, the RMC command transmitted by node 1 also requested reading of contents of the semaphore held by node 4. Accordingly, in the third access period shown, node 4 requests control of the bus and, in the fourth access period shown transmits the value of the semaphore to node 1. Again, assuming that the semaphore was not already set, node 1 then requests control of the bus in the fifth access period shown to write a logical one value to the semaphore, thereby setting the semaphore. Once the semaphore is set, node 1 can release control of the whole of node 4 by requesting control of the bus and then transmitting an RMC "end" command. This command releases the RMC lock for node 4.

At the end of the processing illustrated in FIG. 5, node 1 has taken control of the critical resource associated with the semaphore, but has released general access to node 4 to other nodes. In the course of setting the semaphore, because node 1 placed an RMC lock on the whole of node 4, node 4 was able to write to the semaphore flag without any danger of semaphore being set between the time that node 1 read the semaphore and the time that node 1 wrote to the semaphore. This means that there is no need for node 1 to check that the semaphore has been successfully set.

After releasing the RMC lock (in the eighth access period shown in FIG. 5) node 1 proceeds to access the critical resource. When node 1 has completed accessing the critical resource, it simply makes a further bus request and writes a logical zero to the semaphore held on node 4. This clears the semaphore so that the critical resource can then be accessed by other nodes.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A data processing apparatus in which a first data handling node and a second data handling node are electronically connected to a data bus, said apparatus comprising:

arbitration means, responsive to requests for control of said data bus from said first and second data handling nodes, for allocating control of said data bus to selected ones of said first and second data handling nodes for successive access periods of a predetermined length, wherein said arbitration means comprises:
a plurality of arbitration circuits, each of said arbitration circuits being associated with respective ones of said first data handling node and said second data handling node; and
a plurality of arbitration control lines interconnecting said arbitration circuits,
wherein a first set of said arbitration control lines connects only adjacent pairs of said plurality of arbitration circuits,
wherein a second set of said arbitration control lines connects an intermediate amount of said arbitration circuits, said intermediate amount being more than two arbitration circuits but less than all of said arbitration circuits, and wherein a third set of said arbitration control lines connects all of said arbitration circuits;

a first mini-bus coupled to said first data handling node;

a third data handling node coupled to said finer mini-bus for transmitting a request to said first data handling node along said first mini-bus;

said first data handling node comprising:

means for requesting control of said data bus for a first access period to transmit a data request to said second data handling node during said first access period;

means for relinquishing control of said data bus at the end of said first access period; and means for storing said data request transmitted from said third data handling node to said first data handling node and for forwarding the stored data request to said second data handling node along said data bus;

said second data handling node comprising:

means, responsive to said data request received from said first data handling node, for requesting control of said data bus for a second subsequent access period to transmit data requested by said data request to said first data handling node during said second access period;

means for relinquishing control of said data bus at the end of said second access period; and wherein said arbitration means arbitrates control over said first mini-bus to said first and third data handling nodes.

2. The apparatus according to claim 1, in which said plurality of arbitration circuits is operable during each of said access periods to allocate control of said data bus for a next following access period.

3. The apparatus according to claim 1, in which said plurality of arbitration circuits is operable, in the case of more than one data handling node requesting control of said data bus for a single access period, to select one of said requesting data handling nodes according to a priority order associated with said data handling nodes.

4. The apparatus according to claim 3, in which said priority order associated with said first and second data handling nodes varies between successive access periods according to a predetermined cyclic sequence.

5. The apparatus according to claim 4, comprising a cyclic counter for generating a count value, and in which each of said plurality of arbitration circuits is operable to assert a priority value on said arbitration control lines to request control of said data bus, said priority value for each of said plurality of arbitration circuits being a logical combination of said count value and a fixed value associated with each of said plurality of arbitration circuits.

6. The apparatus according to claim 5, in which said arbitration means comprises means for establishing a dominant priority value on said arbitration control lines in the case of more than one of said plurality of arbitration circuits asserting a priority value on said arbitration control lines to request control of said data bus for a single access period.

7. The apparatus according to claim 1, wherein said third data handling node further comprises:

means for requesting control of said first mini-bus and transmitting said data request along said first mini-bus to said first data handling node; and means for relinquishing control of said first mini-bus when said data request transmission is complete;

wherein, said third data handling node transmits said data request during an access period previous to the first access period, wherein, said means for storing and forwarding stores said data request during the previous access and forwards said data request during said first access period.

8. The apparatus according to claim 1, in which said first data handling node comprises:

means for requesting exclusive access to said second data handling node;

means responsive to a grant of exclusive access to said second data handling node for setting a semaphore flag in said second data handling node, said semaphore flag being associated with a data resource to which simultaneous access by more than one data handling node is not permitted;

means for relinquishing exclusive control of said data handling node;

means for accessing said data resource; and means for resetting said semaphore flag.

9. The apparatus according to claim 8, in which said data resource is located on said second data handling node.

10. A data processing apparatus in which a plurality of data buses are connected to a main bus, said apparatus comprising:

a plurality of data handling nodes connected to each one of said plurality of data buses, each data handling node comprising means for controlling a selected one of said data buses for an access period of a predetermined length, means for transmitting a data item during said access period, and means for relinquishing control of said selected data bus at the end of said access period;

a first set of arbitration means, in communication with a corresponding set of data buses, for allocating control of said corresponding set of data buses to selected ones of said plurality of data handling nodes for successive access periods of a predetermined length;

a plurality of interface nodes, each one of said interface nodes being connected to each one of said plurality of data buses and to said main bus, each interface node comprising means for storing said data item transmitted during said access period by one of said data handling nodes or by another interface node, means for controlling said main bus for another access period of said predetermined duration, means for transmitting said data item during said other access period, and means for relinquishing control of said main data bus at the end of said other access period; and main bus arbitration means, in communication with said main bus, for allocating control of said main bus to selected ones of said interface nodes for successive access periods of a predetermined length.

11. The apparatus according to claim 7, further comprising:

a second mini-bus electronically connected to said second data handling node, wherein, said second data handling node is a second interface node further comprising means for storing said data request received during said first access period;

a fourth data handling node connected to said second mini-bus, wherein, said second data handling node further comprises means for forwarding the stored data request along said second mini-bus to said fourth data handling node during a first intermediary access period occurring after said first access period and before said second access period; and said fourth data handling node comprising:
means for requesting control of said second mini-bus during a second intermediary access period occurring after said first intermediary access period and before said second access period and transmitting said data to said second data handling node in response to said data request received during said first intermediary access period, wherein, said arbitration means arbitrates control over said second mini-bus to said second and fourth data handling nodes.

* * * * *